UNITED STATES PATENT OFFICE.

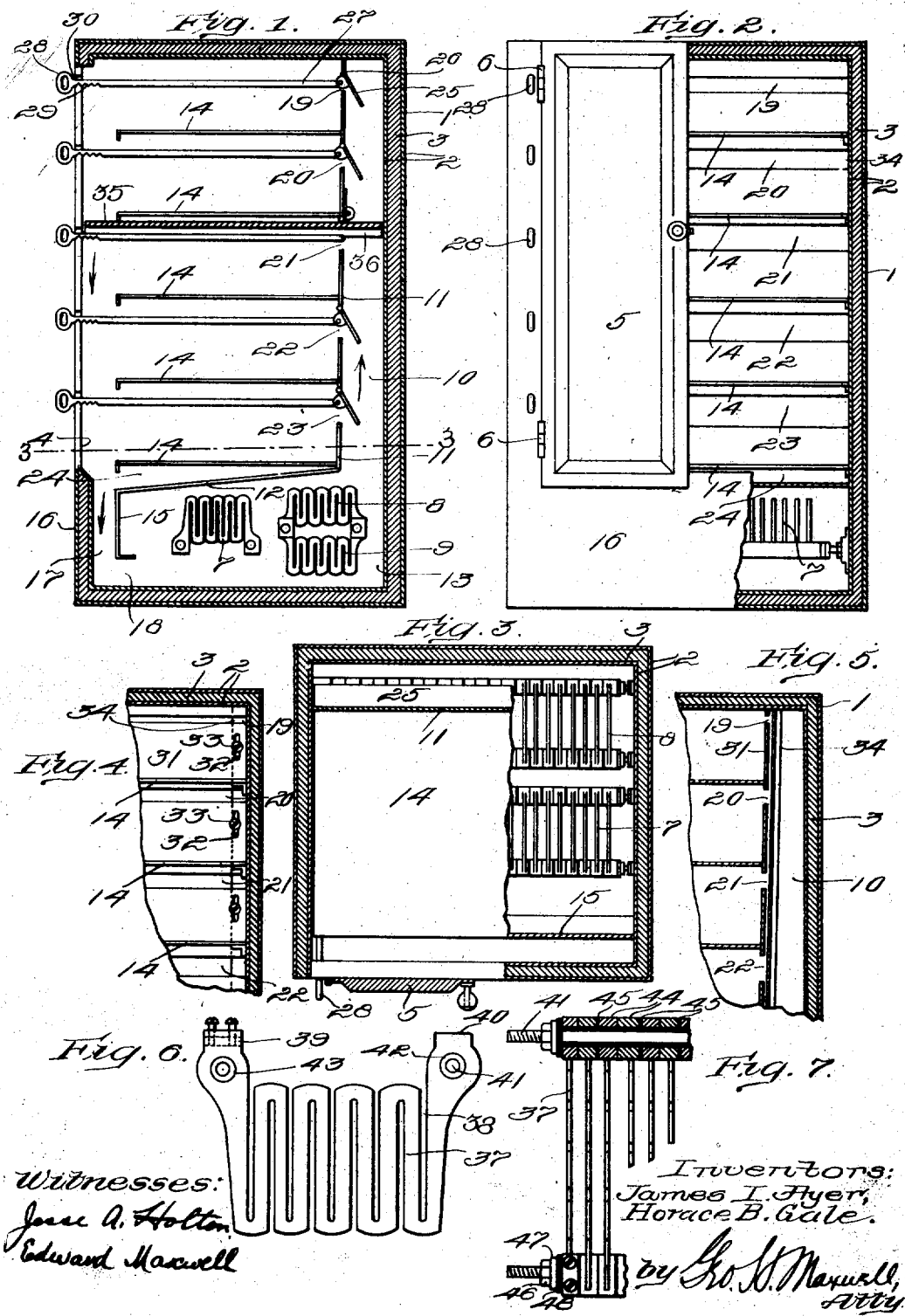

JAMES I. AYER, OF CAMBRIDGE, AND HORACE B. GALE, OF NATICK, MASSACHUSETTS, ASSIGNORS TO SIMPLEX ELECTRIC HEATING COMPANY, OF CAMBRIDGE, MASSACHUSETTS, A CORPORATION OF MASSACHUSETTS.

ELECTRIC BAKING-OVEN.

975,107. Specification of Letters Patent. Patented Nov. 8, 1910.

Application filed November 11, 1909. Serial No. 527,396.

*To all whom it may concern:*

Be it known that we, JAMES I. AYER, a citizen of the United States, and a resident of Cambridge, in the county of Middlesex and State of Massachusetts, and HORACE B. GALE, a citizen of the United States, and a resident of Natick, in the county of Middlesex and State of Massachusetts, have invented an Improvement in Electric Baking-Ovens, of which the following description, in connection with the accompanying drawings, is a specification, like letters on the drawings representing like parts.

The objects of our invention are to produce a compact electric oven having a plurality of shelves, and having provision for an even distribution of heat on the top and bottom of each shelf, while delivering the heat from a single place in the oven, also to provide independent heat regulation for one shelf or a group of shelves independently of the others, and means for entirely shutting off the heat from a portion of the oven when desired, so as to diminish the effective working space and thereby economizing the electric energy, when the oven is doing less than its full capacity of work.

The constructional details and various advantages of our invention will appear more fully in the course of the following detailed description taken with reference to the accompanying drawings, in which we have shown preferred embodiments of the invention.

In the drawings, Figure 1 is a vertical transverse sectional view of the oven; Fig. 2 a front view thereof, partly in section; Fig. 3 a horizontal sectional view on the line 3—3, Fig. 1; Figs. 4 and 5 are fragmentary sectional details of a modified construction viewed respectively from the front and from the side; and Figs. 6 and 7 are enlarged details of the electric heater.

The shell 1 of the oven consists of double walls 2 packed with heat insulating material 3 closed on all sides excepting the front, where the opening 4 is closed by any suitable doors, herein shown as two swinging doors 5 constructed the same as the walls 2 and hinged at 6 to said walls. The electric heater is located at the bottom of the oven and is herein indicated at 7, 8, 9, a flue 10 leading therefrom at the back of the heater, the back wall of the oven constituting the back wall of the flue, and a metal wall or partition 11 the front wall of the flue. From the bottom of this metal wall leading forwardly and downwardly is a closed partition 12 separating the lower part or heating chamber 13 from the upper part or baking chamber. In the baking chamber are arranged shelves 14 of any usual or preferred kind. At the front end of the partition 12 an apron 15 extends downwardly approximately parallel to the front wall 16 of the oven to within a short distance of the bottom to form a return air flue 17. Thus it will be seen that as there is a free upward passage or flue 10 for the escape of the hot air from the highest point of the heating chamber 13 and as the flue 17 opens at 18 at the bottom of the chamber 13, a continuous circulation of the heated air is compelled in the direction of the arrows. This is further facilitated by the fact that the back walls of the oven, being thicker and perfectly tight, retain the heat better than the front walls or doors and hence become hotter than said front walls or doors so that the hot rear wall of the oven facilitates the upward movement of the air while the cooler doors promote the downward movement of the air, which by that time has become slightly cooler than when it left the heating chamber 13 on its upward passage in the flue 10.

In the back metal wall or partition 11 we provide a series of openings or hot air ports 19, 20, 21, 22, 23, preferably graduated in size, the lower ports being larger and decreasing successively to the smallest port at 19. These ports extend horizontally just beneath the shelves or in other words, at the top of each baking compartment, thereby transmitting the heat directly to the bottom of a shelf, for maintaining said shelf properly heated, and directly over or on top of the articles being baked, so that said articles receive an even distribution of heat above and below. The partition 12 and space 24 protect the lower part of the baking chamber from direct radiation from the electric heaters in the heating chamber. Means are provided for regulating each air port 19—23, the preferred means comprising swinging dampers 25, pivoted at their upper sides at 26 and operated by a rod 27 and external handle 28 preferably provided with notches 29 to engage the bottom of the slot 30 through which they operate in the front wall of the oven. In Figs. 4 and 5, we have shown the back wall as composed of a series of plates 31 adjustable by means of slots 32 therein engaged by set bolts 33 operating in side uprights 34. The flue 10 is preferably slightly flaring, being smaller at the top than at the bottom. The reason for providing for a larger entrance for hot air at the bottom of the flue 10, where, as previously stated, the openings are preferably larger into the lower ovens than into the upper ovens, is to promote uniformity of heating effects, as we have found that if each compartment of the baking chamber is provided with the same sized opening or if the dampers are left open exactly the same in all the compartments, the uppermost compartment will be greatly overheated and the lower compartments will be underheated.

It will be apparent that the arrangement of flues is such as to make the air circulation powerful and certain in direction. As the flue 17 is carried down to the bottom of the heating chamber considerably below the partition 12, and as the flue 10 leads from the top of said heating chamber, it follows that the flue 10 is the only path by which the air can naturally escape from the heating chamber. The natural path for the hot air from the electric heaters is therefore up the flue 10 and through the openings 19—23, and, as just explained, in order to force the hot air to distribute itself properly among the different chambers and over and under the different shelves of the oven, the openings or air ports are restricted in area, being smaller at the top of the oven where the air pressure becomes the greatest, and gradually becoming larger therefrom toward the bottom, where the pressure of the air column is less, their area being inversely proportional to the air velocity at the given points in the flue 10, so that a very uniform distribution of heat is obtained on the different shelves of the oven. This heat regulation may be permanently set for distributing the heat as in Figs. 4 and 5, or hand controlled by the dampers 25, which may be held in adjusted positions as shown in Fig. 1.

An advantage of the adjustment shown in Figs. 4 and 5 is that it makes it possible to specially adjust for prolonged use any given shelf for any special work required of that compartment of the heating chamber, so that one compartment may be permanently set to be abnormally hot or abnormally cold as compared with the rest. The hand-operated dampers provide means for accomplishing the same purpose temporarily, so that the hot air supply may be varied in any manner desired momentarily or otherwise, as may be required. The dampers make it practicable to cut off the hot air supply altogether from any shelf. In this case the shelves will of course be solid instead of in the form of grid irons, although for general purposes we do not limit this feature of our invention to any particular construction. To permit the entire closing of a given portion of the oven, we preferably provide at a desired point or points a slide partition 35, preferably composed in whole or in part of heat insulating material, said slide partition being mounted on an angle iron or guide 36 so that it can be shoved in place as shown in Fig. 1 so as to cut off the upper portion of the oven and flues, or removed, thereby restoring the entire oven to normal use. This arrangement does not interfere in any way with the proper circulation of the hot air in the section below this damper partition or cut-off. This permits the amount of electric current going to the electric heaters to be correspondingly reduced so that the oven may thus be run more economically for a small baking.

In Figs. 6 and 7 are illustrated more in detail the preferred type and arrangement of electric heaters which are especially adapted and arranged to coöperate with an oven of this character, in which, in order to get a uniform distribution of heat in all parts of the oven, it is necessary to have a rapid and powerful circulation of air. If the air currents were slow the air would be cooled in passing across, for example, from the back to the front side of the oven between the shelves so that the baking would be uneven, the back side of the shelf being hotter than the front side. By providing however a large unobstructed flue space for the passage of the air, excepting as necessarily limited by the controlling ports 19—23, and giving positive direction to the air current by the arrangement of the flues already described, the circulation of the air is so rapid that the temperature is practically the same at the front and back of each shelf. To accomplish this unobstructed passage of the air at the heating point, the heaters are made in the form of flat plates or grids 37 arranged in parallel planes with a comparatively wide intervening air space, said plates being set edgewise vertically or parallel to the flow of the air so as to obstruct it as little as possible. In Fig. 6 this flat plate, of zig-zag arrangement with air insulation 38, affords a high resistance path for the current between the terminals 39, 40. These plates are mounted in a series on rods 41 surrounded by an insulation covering 42 tightly fitting the holes 43 in the stampings or plates 37. The ends terminate in bosses 44 separated in pairs by insulation rings 45 so that the bosses of each pair of plates contact with each other, alternated in zig-zag arrangement at the opposite ends as will be readily understood from 7, so that the current is caused to traverse the plates in series. At the ends of the rods 41 the plates are clamped by nuts 46, washers 47 and interposed insulation 48. These rods are attached to the side walls of the oven so as to hold the plates in position. These small rods, being the only parts of the electric heater construction that run transversely to the air current, offer very little obstruction to the free flow of air. This construction and arrangement of heaters contributes materially to the successful operation of the oven. It combines with the special flue arrangement or system of air circulation to produce a circulation sufficiently positive and rapid to permit concentrating the electric heaters at one point, where they are well protected, while still attaining practically a uniform heat in all parts of the baking chamber.

It will be understood that the proportions of the oven and various details of the arrangement will be varied to suit the particular space or other arrangement where the oven is to be installed, and that, in general, many variations in details may be resorted to without departing from the spirit and scope of our invention as defined in the following claims.

Having described our invention, what we claim as new and desire to secure by Letters Patent is, 1. In combination, an electrically heated oven inclosure, a baking chamber therein, having a series of shelves spaced one above the other, a heating chamber below and separated from the baking chamber in said inclosure, electric heating elements in said heating chamber, a cool air flue from one portion of the baking chamber opening into the lower part of the heating chamber, and a hot air flue extending upward from the upper portion of the heating chamber to the baking chamber.

2. In combination, an electrically heated oven inclosure, a baking chamber therein, having a series of shelves spaced one above the other, a heating chamber below and separated from the baking chamber in said inclosure, electric heating elements in said heating chamber, a cool air flue from one portion of the baking chamber opening into the lower part of the heating chamber, a hot air flue extending upward from the upper portion of the heating chamber to the baking chamber, and means to regulate the delivery of hot air to the different shelves.

3. In combination, an electrically heated oven inclosure, a baking chamber therein, having a series of shelves spaced one above the other, a heating chamber below and separated from the baking chamber in said inclosure, electric heating elements in said heating chamber, a cool air flue from one portion of the baking chamber opening into the lower part of the heating chamber, a hot air flue extending upward from the upper portion of the heating chamber to the baking chamber, and independent heat regulating means for controlling the delivery of hot air from said hot air flue to the different shelves.

4. In combination, an electrically heated oven inclosure, a baking chamber therein, having a series of shelves spaced one above the other, a heating chamber below and separated from the baking chamber in said inclosure, electric heating elements in said heating chamber, a cool air flue from one portion of the baking chamber opening into the lower part of the heating chamber, a hot air flue extending upward from the upper portion of the heating chamber to the baking chamber, and means to regulate the temperature of the different shelves, consisting of air ports opening from said hot air flue into the baking chamber over said respective shelves graduated in size so as to present less area for the admission of air at the upper levels than at the lower levels.

5. In combination, an electrically heated oven inclosure, a baking chamber therein, having a series of shelves spaced one above the other, a heating chamber below and separated from the baking chamber in said inclosure, electric heating elements in said heating chamber, a cool air flue from one portion of the baking chamber opening into the lower part of the heating chamber, a hot air flue extending upward from the upper portion of the heating chamber to the baking chamber, and means to shut off the hot air from a given area of the baking chamber so as to diminish the heated space.

6. In combination, an electrically heated oven inclosure, a baking chamber therein, having a series of shelves spaced one above the other, a heating chamber below and separated from the baking chamber in said inclosure, electric heating elements consisting of conducting plates set vertically edgewise to the normal flow of the air current in said heating chamber, a cool air flue from one portion of the baking chamber opening into the lower part of the heating chamber, and a hot air flue extending upward from the upper portion of the heating chamber to the baking chamber.

7. An electrically heated oven, comprising an inclosing shell having a baking chamber, a series of shelves therein spaced one above the other, a heating chamber in said shell below and separated from the baking chamber, electric heating elements consisting of conducting plates set vertically edgewise to the normal flow of the air current in said heating chamber, a cool air flue from one portion of the baking chamber opening into the lower part of the heating chamber, a hot air flue extending upward from the upper portion of the heating chamber to the baking chamber, and means to regulate the delivery of hot air to the different shelves.

8. An electrically heated oven, comprising an inclosing shell having a baking chamber, a series of shelves therein spaced one above the other, a heating chamber in said shell below and separated from the baking chamber, electric heating elements, comprising a series of resistance conductors in the form of parallel flat grids set vertically edgewise, mounted and clamped together on horizontal rods in said heating chamber so as to offer a minimum resistance to the flow of air in its normal course, a cool air flue from one portion of the baking chamber opening into the lower part of the heating chamber, and a hot air flue extending upward from the upper portion of the heating chamber to the baking chamber.

9. An electrically heated oven, comprising an inclosing shell having a baking chamber, a series of shelves therein spaced one above the other, a heating chamber in said shell below and separated from the baking chamber, electric heating elements, comprising a series of resistance conductors in the form of parallel flat grids set vertically edgewise, mounted and clamped together on horizontal rods in said heating chamber so as to offer a minimum resistance to the flow of air in its normal course, a cool air flue from one portion of the baking chamber opening into the lower part of the heating chamber, a hot air flue extending upward from the upper portion of the heating chamber to the baking chamber, and means to regulate the delivery of hot air to the different shelves.

10. An electrically heated oven, comprising an inclosing shell having a baking chamber, a series of shelves therein spaced one above the other, a heating chamber in said shell below said baking chamber, a hot air flue opening from the top of said heating chamber adjacent the back, closed wall of the oven, a cool air flue located at the opposite cooler entrance side of the oven and opening into said heating chamber at the bottom thereof, said heating chamber having its upper wall separated from the bottom shelf of the baking chamber by an air space and inclined upwardly and rearwardly from the inlet opening of the cool air flue to the entrance opening of the hot air flue, electric heating elements mounted together in said heating chamber, and separate hot air ports from said hot air flue into the individual baking compartments between adjacent shelves.

11. An electrically heated oven, comprising an inclosing shell having a baking chamber, a series of shelves therein spaced one above the other, a heating chamber in said shell below said baking chamber, a hot air flue opening from the top of said heating chamber adjacent the back, closed wall of the oven, a cool air flue located at the opposite cooler entrance side of the oven and opening into said heating chamber at the bottom thereof, electric heating elements mounted together in said heating chamber, and a separate hot air port from said hot air flue into the baking chamber at the top of each baking compartment formed above each shelf.

12. An electrically heated oven, comprising a heat insulating shell, electric heating elements therein, a baking chamber in said shell, and means for controlling the distribution of heat from said heating elements to said baking chamber.

13. An electrically heated oven, comprising a heat insulating shell, electric heating elements in the base thereof, a baking chamber in said shell arranged relatively to said heating elements to permit a circulation of air therethrough and therefrom, and means for controlling the distribution of heated air to said baking chamber.

14. An electrically heated oven, comprising a heat insulating shell, an electric heating element in the base thereof, a baking chamber above said heating element, a passage constructed to circulate heated air from said heating element to the baking chamber at one side of the oven, a passage being arranged to conduct cool air from the baking chamber to the heating element along another side of the oven, and a door on said second side adjacent said cool air passage.

15. An electrically heated oven, comprising a heat insulating shell, electric heating elements therein, a baking chamber arranged for the circulation of air to and from said electric heating elements, means for controlling the distribution of heated air to said baking chamber, consisting of a series of dampers having operating devices extending to a side of said shell, and a door on said side.

In testimony whereof, we have signed our names to this specification, in the presence of two subscribing witnesses.

JAS. I. AYER.
HORACE B. GALE.

Witnesses:
Dora A. Proctor,
Elizabeth M. Conlin.